US012706867B2

(12) United States Patent
Dai et al.

(10) Patent No.: US 12,706,867 B2
(45) Date of Patent: *Aug. 11, 2026

(54) STORING ENCODED PACKETS AT A SERVER

(71) Applicant: Zoom Communications, Inc., San Jose, CA (US)

(72) Inventors: Yongxiang Dai, Hefei (CN); Shaohua Li, HeFei (CN); Lin Sun, Cupertino, CA (US)

(73) Assignee: Zoom Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/767,401

(22) Filed: Jul. 9, 2024

(65) Prior Publication Data

US 2024/0364644 A1 Oct. 31, 2024

Related U.S. Application Data

(63) Continuation of application No. 18/169,426, filed on Feb. 15, 2023, now Pat. No. 12,074,810, which is a continuation of application No. 17/515,479, filed on Oct. 31, 2021, now Pat. No. 11,711,322.

(51) Int. Cl.

| | |
|---|---|
| ***H04L 49/90*** | (2022.01) |
| ***H04L 47/24*** | (2022.01) |
| ***H04L 65/65*** | (2022.01) |

(52) U.S. Cl.

CPC .......... *H04L 49/9094* (2013.01); *H04L 47/24* (2013.01); *H04L 65/65* (2022.05)

(58) Field of Classification Search

CPC ...... H04L 49/9094; H04L 65/65; H04L 47/24

See application file for complete search history.

(56) References Cited

U.S. PATENT DOCUMENTS

| | | | |
|---|---|---|---|
| 7,079,486 | B2 | 7/2006 | Colavito et al. |
| 7,251,246 | B2 | 7/2007 | Ross |
| 7,324,444 | B1 | 1/2008 | Liang et al. |

(Continued)

FOREIGN PATENT DOCUMENTS

| | | | |
|---|---|---|---|
| EP | 1891502 | B1 | 4/2011 |

OTHER PUBLICATIONS

Adaptive Playout Mechanisms for Packetized Audio Applications in Wide-Area Networks, http://www.cs.columbia.edu/~hgs/papers/Ramj94_Adaptive.pdf, Ramachandran Ramjee et al., University of Massachusetts, Department of Computer Science, Aug. 26, 2021, 9 pages.

(Continued)

*Primary Examiner* — Nazia Naoreen

(74) *Attorney, Agent, or Firm* — Young Basile Hanlon & 1MacFarlane. P.C.

(57) ABSTRACT

A computer stores packets from a first device at a first buffer. The computer decodes the packets to obtain decoded packets at a decoder. The computer encodes encoding the decoded packets to obtain encoded packets at an encoder. The computer transmits the encoded packets from the encoder to a storage unit. The computer fetches the encoded packets from the storage unit using a second buffer. The computer causes a transmitter to transmit the encoded packets from the second buffer to a second device.

20 Claims, 8 Drawing Sheets

(56) References Cited

U.S. PATENT DOCUMENTS

| | | | |
|---|---|---|---|
| 7,496,086 | B2 | 2/2009 | Eckberg |
| 7,551,647 | B2 | 6/2009 | Fellman et al. |
| 10,049,681 | B2 * | 8/2018 | Sinder .................. H04L 1/0083 |
| 10,313,276 | B2 | 6/2019 | Jansson et al. |
| 11,711,322 | B2 | 7/2023 | Dai et al. |

OTHER PUBLICATIONS

A New Optimum Jitter Protection for Conversational VoIP, http://www.ece.mcgill.ca/~pkabal/papers/2009/GongC2009.pdf, Qipeng Gong et al., McGill University, Electrical & Computer Engineering, Nov. 2009, 5 pages.

Adaptive Playout Scheduling and Loss Concealment for Voice Communication over IP Networks, http://web.stanford.edu/~bgirod/pdfs/LiangMM2002.pdf, Yi J. Liang et al., IEEE, Aug. 26, 2021, 12 pages.

Jitter Buffer Design for RTPEngine #803, https://github.com/sipwise/rtpengine/issues/803, Balajee-Plivo, Jul. 10, 2019, 5 pages.

* cited by examiner

STORING ENCODED PACKETS AT A SERVER

CROSS-REFERENCE TO RELATED APPLICATION(S)

This application is a continuation of U.S. patent application Ser. No. 18/169,426, now U.S. Pat. No. 12,074,810, filed Feb. 15, 2023, tilted "PACKET PROCESSING AT A COMPUTER," which is a continuation of U.S. patent application Ser. No. 17/515,479, now U.S. Pat. No. 11,711,322, filed Oct. 31, 2021, titled "PACKET PROCESSING AT THE SERVER." The entire disclosures of the foregoing applications are hereby incorporated by reference.

FIELD

This disclosure relates to packet processing at a server, for example, the processing of audio packets during a call or conference to reduce jitter.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
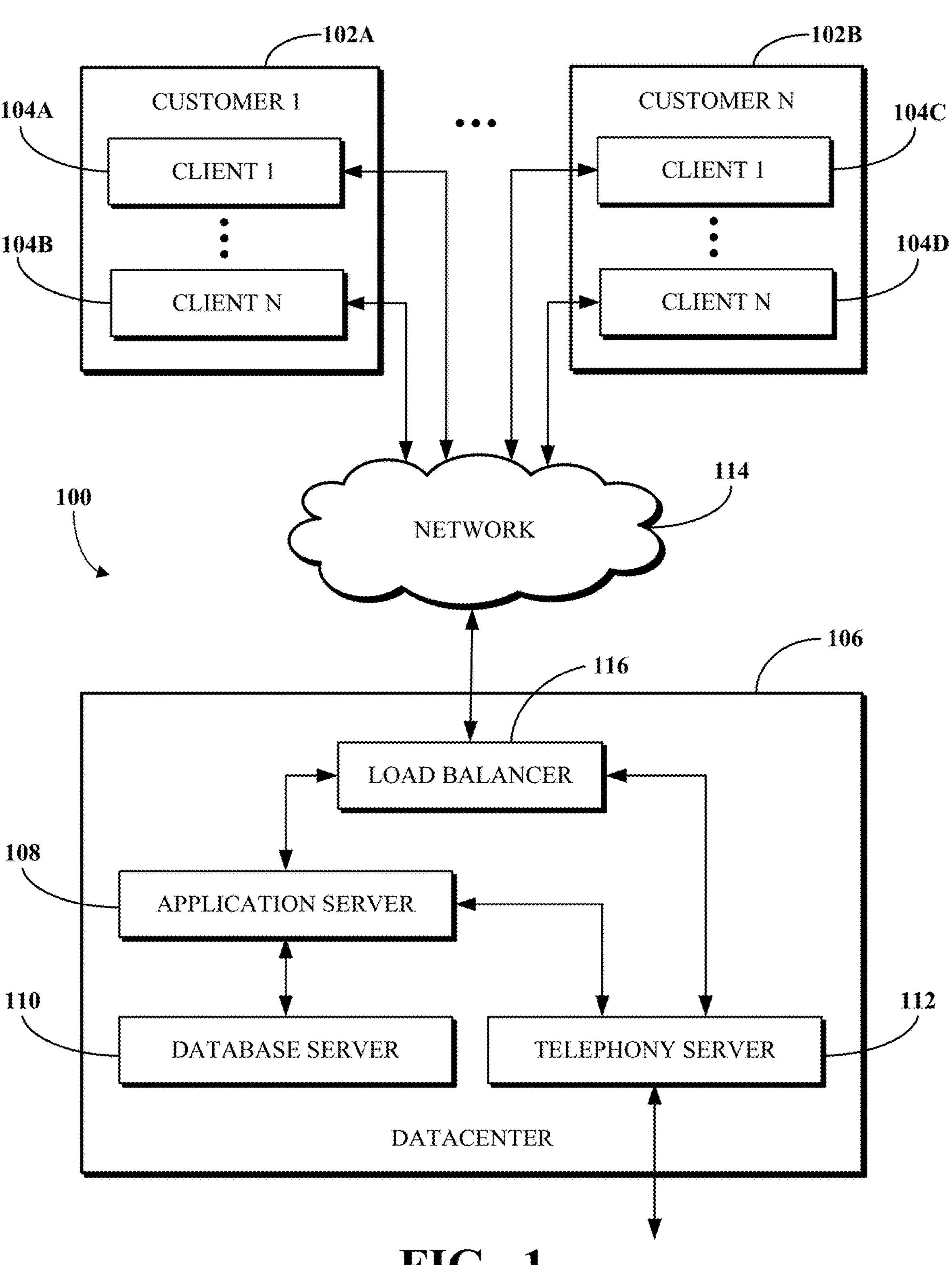
FIG. 1 is a block diagram of an example of an electronic computing and communications system.

Some voice communication protocols, for example, Voice-over Internet Protocol (VOIP), use real-time transport protocol (RTP) packets to communicate audio between devices, such as devices connected to communication services of a unified communications as a service (UCaaS) platform or other software platform. Network congestion or other issues (e.g., non-congestion-based latency at a server or a device involved in the communication) with the processing and/or transmission of audio data for such a communication service (e.g., a telephone call or conference) can cause the audio from one or more devices to be unevenly received at another device, resulting in poor quality. In particular, such issues may cause the audio data from those one or more devices being unevenly received, resulting in jitter. To address this, some devices, such as some smartphone, laptop computer or desktop computer models, may have jitter buffers that are capable of handling the unevenly received audio by ensuring that the packets are in the correct order and applying error correction. However, in some cases, the device may be a traditional landline phone connected to the public switched telephone network (PSTN) or a mobile phone, laptop computer or desktop computer that has a very small jitter buffer.

Jitter solution schemes may be implemented at a device. However, these solutions are unreliable and provide suboptimal audio quality improvement. Some "thin" devices may have no jitter buffer or a small jitter buffer that is incapable of handling all of the incoming packets in real-time (e.g., without delay caused by the processing of the packets). One client-side jitter solution scheme implement a jitter buffer at the device that handles both the out-of-order processing (e.g., packets arriving in a different order from the order in which they were generated due to changes in network speed) and the spike/burst processing (e.g., packets arriving in spikes or bursts that overwhelm the packet processing device). Due to the limitations of some devices, out-of-order packet processing and burst processing may be handled via separate threads, which is unreliable for real-time jitter processing. To process jitter at the server level, some of the disclosed implementations use a reorder buffer prior to decoding the received packets to handle the out-of-order processing, and a speed buffer after the packets are encoded to handle the spike/burst processing. By splitting the processing in this way, errors are reduced to provide reliable and robust audio quality.

Implementations of this disclosure address problems such as these by packet processing at a server using a speed buffer to smooth out jitter and improve audio quality without relying on the limited capability of the devices to handle the jitter. In order to process jitter in real-time at the server, out-of-order packet processing and burst processing is implemented in a single thread. The single thread processing reduces the inaccuracy of the typical solutions and improves reliability and audio quality.

To implement the single thread processing at the server, received RTP packets from a first device are processed through a reorder buffer prior to decoding the RTP packets. The decoded RTP packets are encoded and then processed through a speed buffer prior to transmission to a second device. The encoded RTP packets are sent to a lock-free message queue where they can be accessed by the speed buffer. The speed buffer includes a driver that is configured to fetch one or more encoded RTP packets from the lock-free message queue at a predetermined interval, for example, every 20 milliseconds (ms). The speed buffer then transmits the encoded packets to the second device at a predetermined interval. For example, the predetermined interval may be based on network congestion. The speed buffer acts as a pacer to output the encoded RTP packets at a consistent interval and thus reduces or eliminates jitter of audio data. The speed buffer may be configured to receive packets from lock-free message queues of multiple session threads in parallel.

In some examples, the server may include multiple speed buffers. The server may automatically enable speed buffers on an as-needed basis, for example, based on network congestion, quality of service (QOS), or both. In an example, the server may automatically enable more speed buffers as network congestion increases, QoS decreases, or both. For example, the server may initially (e.g., at 5:00 am on a weekday) have a single speed buffer. As network congestion increases (e.g., at 9:00 am on the weekday, as businesses open and more devices start participating in calls), the server may add additional speed buffer(s) to handle the increased traffic. Alternatively, if the network congestion does not increase but the server determines that the QoS is decreasing, the server may add additional speed buffer(s) to improve the QoS.

To describe some implementations in greater detail, reference is first made to examples of hardware and software structures used to implement packet processing at a server. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be VOIP-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a PSTN system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
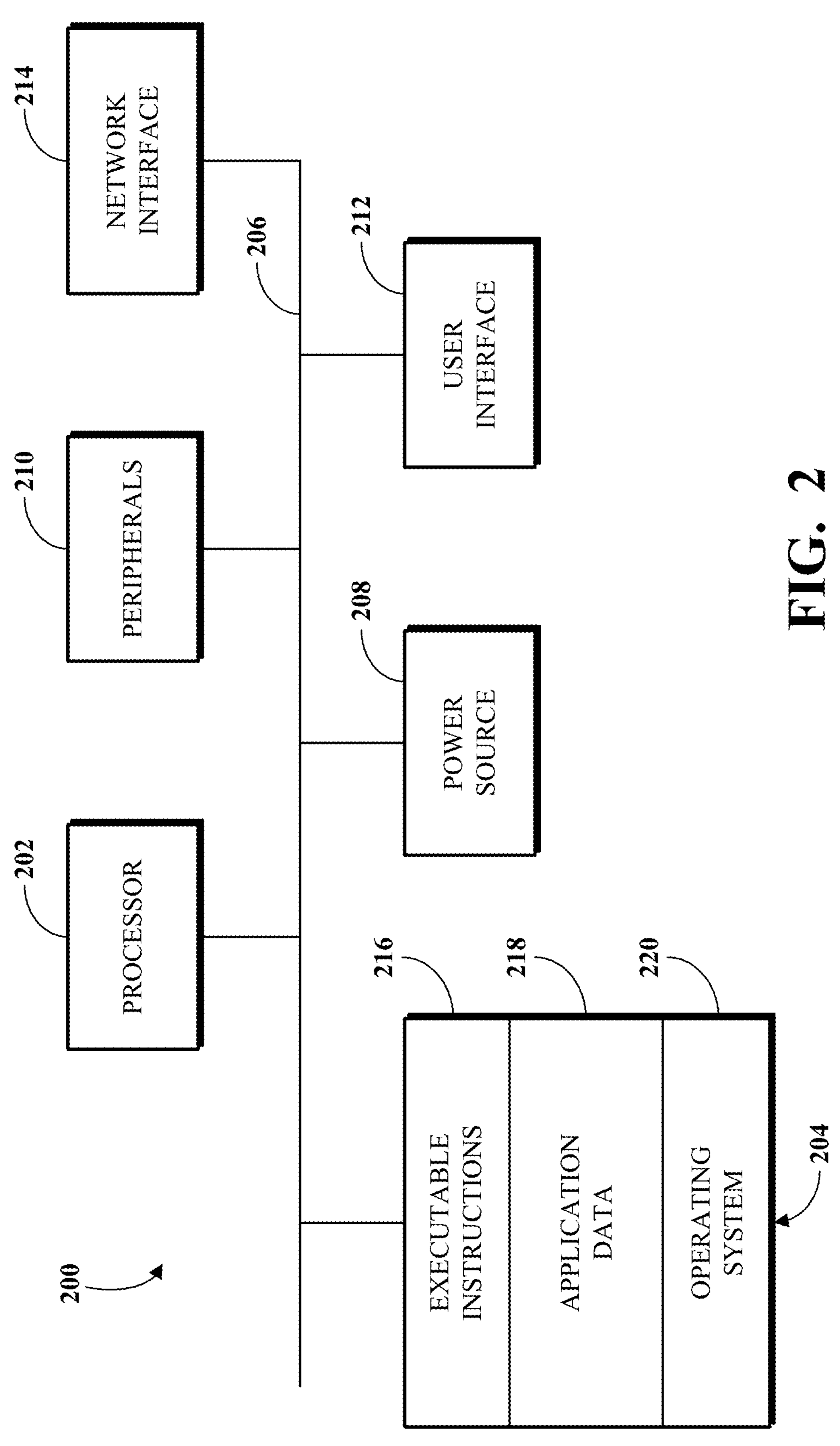
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
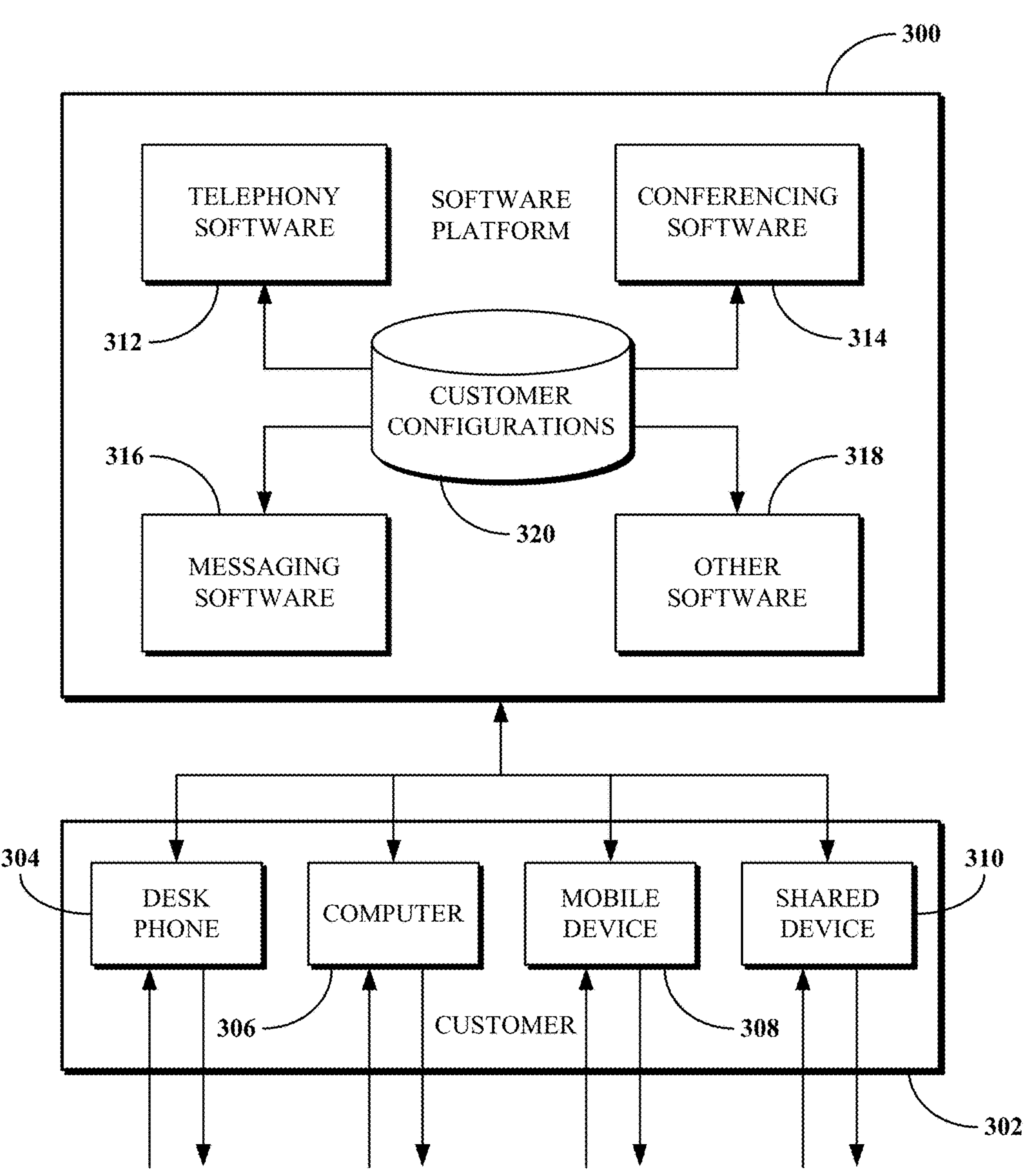
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients, including the desk phone 304, the computer 306, the mobile device 308, and the shared device 310, includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients, including the desk phone 304, the computer 306, the mobile device 308, and the shared device 310, and other telephony-enabled devices, which may be other ones of the clients, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for packet processing at a server.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients, including the desk phone 304, the computer 306, the mobile device 308, and the shared device 310.

Figure 4:
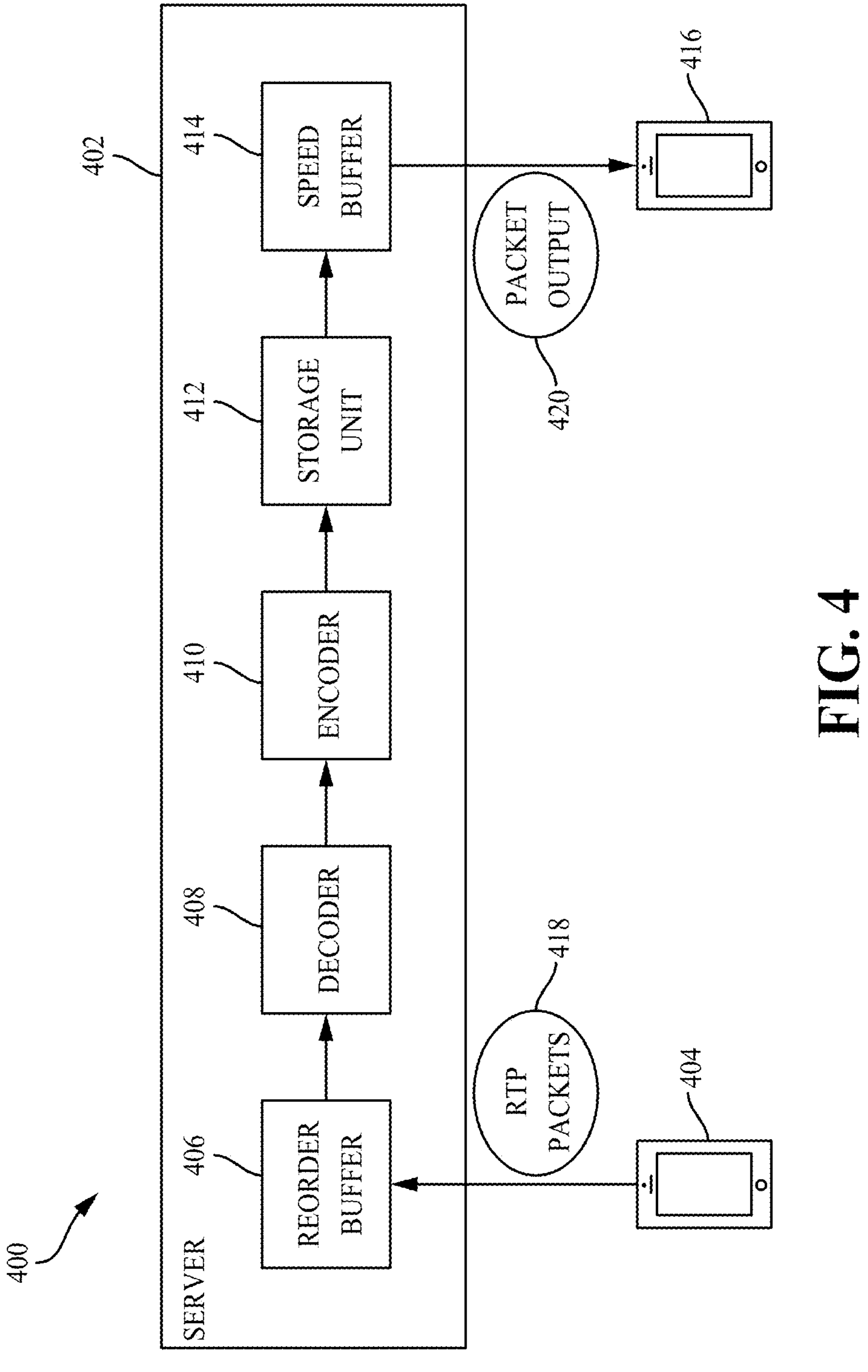
FIG. 4 illustrates an example system in which packet processing may be implemented.

FIG. 4 illustrates an example system 400 in which packet processing may be implemented. As shown, the system 400 includes a server 402 and devices 404 and 416. The devices 404 and 416 may be engaged in an active session (e.g., a voice call or an audio conference) via the facilitated by the server 402. The server 402 may correspond to a telephony server 112 or the application server 108. The device 404 and 416 may be client devices. For example, each of the devices 404 and 416 may correspond to at least one of the clients 104A, 104B, 104C or 104D. The devices 404 and 416 and the server 402 are each a computing device, for example, the computing device 200 shown in FIG. 2. Although two devices 404 and 416 are shown, other numbers of devices may be involved in the active session and thus packet processing may be performed for audio data received from one or more devices including the device 404.

As illustrated, the server 402 includes a reorder buffer 406, a decoder 408, an encoder 410, a storage unit 412, and a speed buffer 414. Each of the reorder buffer 406, the decoder 408, the encoder 410, the storage unit 412, and the speed buffer 414 may be implemented using software, hardware, or a combination of software and hardware. The software may be stored in a memory (e.g., the memory 204) of the server 402.

As shown, the server 402 receives RTP packets 418 from the device 404. The RTP packets may include voice data. The RTP packets 418 may be received using a receiver, which may be a component of the network interface 214 shown in FIG. 2. The received RTP packets 418 are provided to the reorder buffer 406. The reorder buffer 406 processes the received RTP packets 418 to generate sequentially ordered packets. In some cases, the RTP packets 418 might not arrive to the server 402 from the device 404 in the order they were generated due to differences in network speed, thereby necessitating the use of the reorder buffer 406 to ensure that the packets are processed in order in which they were generating. The reorder buffer 406 provides the sequentially ordered packets to the decoder 408.

The decoder 408 decodes the sequentially ordered packets to obtain decoded packets. The decoder 408 provides the decoded packets to the encoder 410. The encoder 410 encodes the decoded packets to obtain encoded packets. The encoder 410 transmits the encoded packets to the storage unit 412. In some examples, the packets are processed between being decoded 408 by the decoder and being re-encoded by the encoder 410. For example, artificial intelligence techniques may be applied to forego re-encoding packets that lack human voice data. The storage unit 412 stores packets for further processing (e.g., as described below). In some implementations, the storage unit 412 may leverage a first-in-first-out data structure, such as a queue, to ensure that packets are further processed in the same order as they enter the storage unit 412.

The speed buffer 414 fetches the encoded packets from the storage unit 412 at a first interval (e.g., every 20 or 30 ms). The speed buffer 414 causes a transmitter (e.g., a component of the network interface 214) of the server 402 to transmit, as a packet output 420, the encoded packets to the second device 416 at a second interval (e.g., every 20 or 30 ms). In some cases, the second interval may be different from the first interval.

In some implementations, the system 400 is used in a telephone call between the devices 404 and 416. For example, a user of the device 404 dials a telephone number associated, in the PSTN, with the device 416 and is connected with the device 416 via the server 402. When the user speaks into a microphone of the device 404, the RTP packets 418 are generated and transmitted (e.g., over the PSTN or another network) to the server 402. The server 402 then processes those packets to reduce jitter using the reorder buffer 406, the decoder 408, the encoder 410, the storage unit 412, and the speed buffer 414 to generate the packet output 420. The server transmits the packet output 420 to the device 416. The device 416 decodes the received packet output 420 and plays the audio spoken by the user of the device 404.

Figure 5:
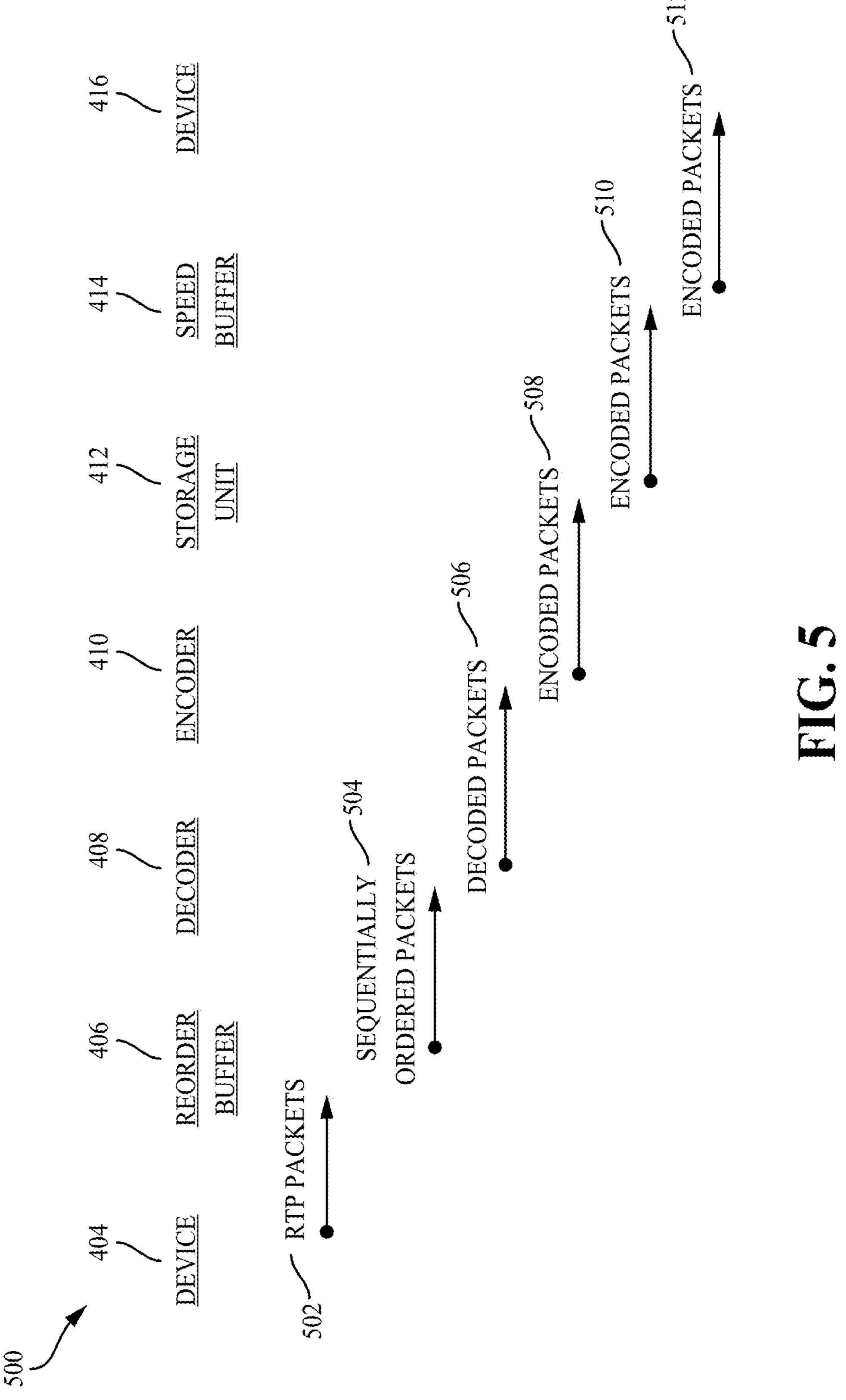
FIG. 5 is a data flow diagram of a sequence of operations for packet processing.

FIG. 5 is a data flow diagram of a sequence 500 of operations for packet processing. As shown, the sequence 500 uses the device 404, the reorder buffer 406, the decoder 408, the encoder 410, the storage unit 412, the speed buffer 414, and the device 416.

At block 502, the device 404 transmits RTP packets to the reorder buffer 406. The RTP packets include audio from the device 404 (e.g., audio recorded by the microphone of the device 404 for transmission to the device 416). The RTP packets may be received via a receiver of a network interface of the server 402, and routed from the receiver to the reorder buffer 406. The reorder buffer 406 generates sequentially ordered packets from the RTP packets. The sequentially ordered packets are generated based on timestamps of the packets received from the device 404. The timestamps may correspond to the times when the packets were generated at the device 4040. RTP packets may be used for telephony communications (e.g., VOIP communication) between the device 404 and the device 416 by way of the server 402.

At block 504, the reorder buffer 406 transmits the sequentially ordered packets to the decoder 408. When a packet is received, the driver for the transmission of block 504 is the receipt of the packet. When no packet is received, a 20 ms (or other time period) timer is started and a packet is transmitted from the reorder buffer 406 at the end of the 20 ms timer. The decoder 408 decodes the sequentially ordered packets to obtain decoded packets. Decoding the sequentially ordered packets may include accessing the payloads of the packets. The payload may include the data (e.g., audio data) being transmitted by or otherwise within the packets. Accessing the payloads of the packets for decoding the sequentially ordered packets may include determining, for example, using artificial intelligence techniques, whether the packets include human voice and discarding the packets that lack human voice.

At block 506, the decoder 408 transmits the decoded packets to the encoder 410. The encoder 410 encodes the decoded packets to obtain encoded packets. The encoded packets may be encoded for further processing or transmission to the device 416, as described herein. In some cases, the packets that lack human voice may be discarded, resulting in only the packets including human voice being re-encoded and provided for further downstream processing. In some examples, the packets are processed between being decoded and being re-encoded. In some embodiments, the decoder 408 and the encoder 410 may be removed and the reorder buffer 406 may provide packets directly to the storage unit 412. The decoding by the decoder 408 and the re-encoding by the encoder 410 may occur when the packets are being received and transmitted using different technologies, for example, if the device 404 is a traditional landline phone connected to the PSTN and the device 416 is a VOIP phone connected to the Internet. For the connection between the traditional landline phone and the VOIP phone, the server 402 may handle transcoding.

At block 508, the encoder 410 transmits the encoded packets to the storage unit 412. The storage unit 412 may be implemented using a queue or other first-in-first-out (FIFO) data structure. The storage unit 412 may be implemented in software, hardware or a combination of software and hardware. The queue or the other FIFO data structure ensures that encoded packets exit the storage unit 412 in the same order as the encoded packets entered the storage unit 412. The queue or other FIFO data structure can be implemented in software, hardware or a combination of software and hardware.

In some implementations, the storage unit 412 is a lock-free message queue. A lock-free message queue is a queue applying concurrency but without locking that stores message data, such as packets. Concurrency allows the server 402 to execute multiple tasks on the lock-free message queue in parallel. For example, in some implementations, enqueuing and dequeuing may be done in parallel. The queue being "lock-free" indicates that at least one thread can access the queue at any time. When using the lock-free message queue, slow or stopped processes (e.g., at the encoder 410 or the speed buffer 414) do not prevent other processes from accessing data in the queue. The lock-free message queue may provide two interfaces: enqueue and dequeue. Enqueue adds a new packet to the end of the queue, behind all of the other packets in the queue. Dequeue removes a packet from the front of the queue. A queue attempts to replicate a line-up (e.g., of customers at a checkout line or vehicles at a toll booth) in the real world, where the first item in the queue or line-up is the first item out of the queue or line-up.

At block 510, the speed buffer 414 fetches the encoded packets from the storage unit 412 at a first interval. The first interval may be set based on a speed at which the speed buffer 414 requests packets. In particular, the lock-free nature of the storage unit 412 allows the speed buffer 414 to fetch packets whenever the speed buffer 414 requests packets. For example, the speed buffer may request packets at the end of every first interval, for instance, once every N (e.g., 25) ms.

At block 512, the speed buffer 414 transmits the encoded packets to the device 416 at a second interval. The second interval may be different from the first interval. The second interval may be set based on the packet processing capabilities of the device 416 and/or based on network capacity between the server 402 and the device 416. For example, the second interval may be computed based on a packet processing speed of the device 416. In some examples, the second interval may be set such that the device 416 processes packets at 80% of its maximum packet processing speed.

Figure 6:
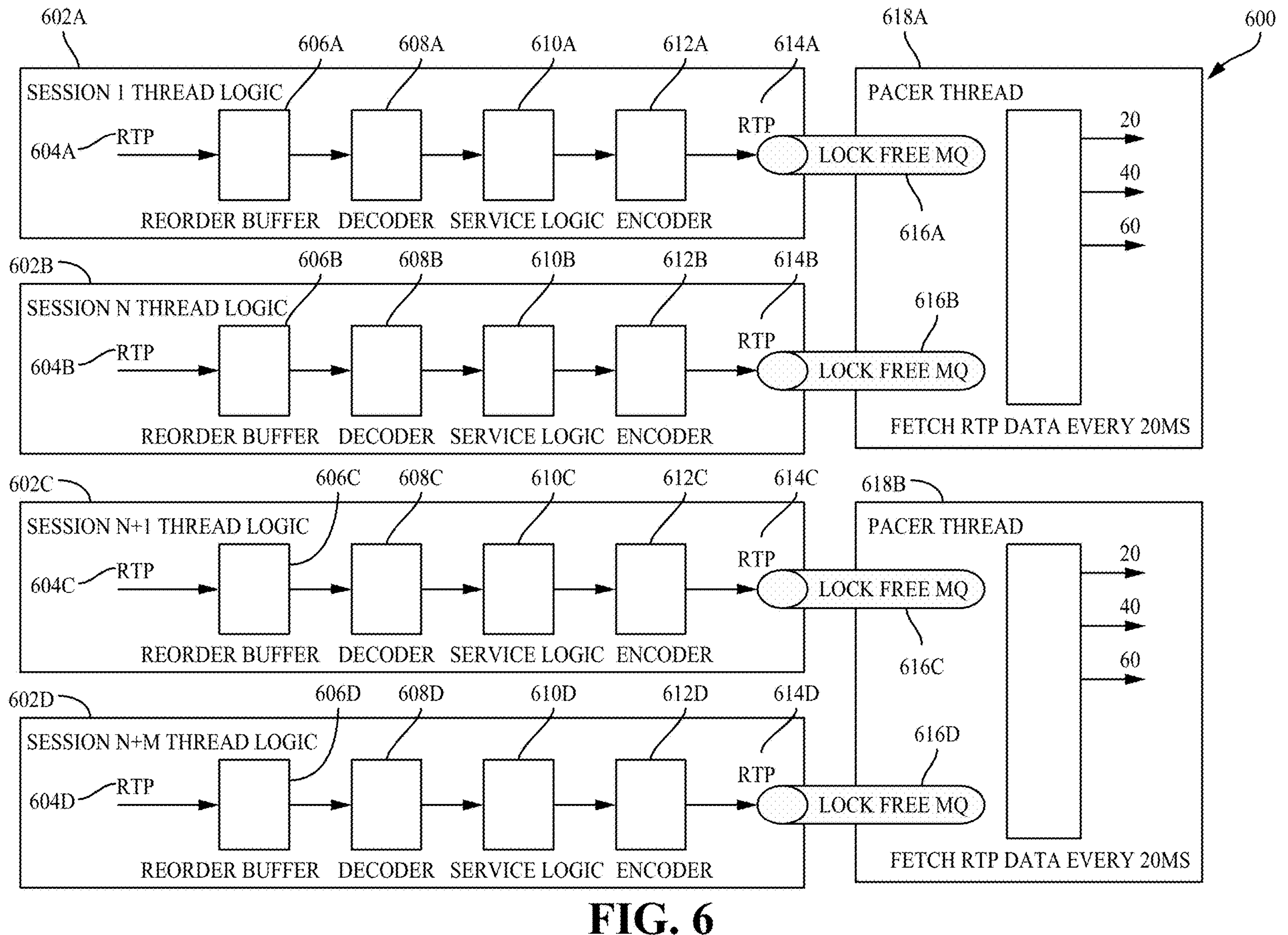
FIG. 6 is a thread diagram for packet processing.

FIG. 6 is a thread diagram 600 for packet processing. As shown, the thread diagram 600 includes Session 1 Thread Logic 602A, Session N Thread Logic 602B, Session N+1 Thread Logic 602C, and Session N+M thread logic 602D, where N and M are the same or different integers greater than 1.

As shown in the Session 1 Thread Logic 602A, RTP packets 604A are provided to a reorder buffer 606A (e.g., all or part of the reorder buffer 406), as described above. The reorder buffer 606A provides sequentially ordered packets to a decoder 608A (e.g., all or part of the decoder 408), as described above. The decoder 608A provides decoded packets to service logic 610A. The service logic 610A stores the decoded packets for processing by the encoder 612A (e.g., all or part of the encoder 410). The encoder 612A provides encoded RTP packets 614A to a lock-free message queue (MQ) 616A. The lock-free MQ 616A may correspond to the storage unit 412, as described above.

The Session N Thread Logic 602B includes RTP packets 604B, a reorder buffer 606B, a decoder 608B, service logic 610B, an encoder 612B, encoded RTP packets 614B, and a lock-free MQ 616B that are structurally and functionally similar to the RTP packets 604A, the reorder buffer 606A, the decoder 608A, the service logic 610A, the encoder 612A, the encoded RTP packets 614A, and the lock-free MQ 616A of the Session 1 Thread Logic 602A. Similarly, the Session N+1 Thread Logic 602C includes RTP packets 604C, a reorder buffer 606C, a decoder 608C, service logic 610C, an encoder 612C, encoded RTP packets 614C, and a lock-free MQ 616C that are structurally and functionally similar to the RTP packets 604A, the reorder buffer 606A, the decoder 608A, the service logic 610A, the encoder 612A, the encoded RTP packets 614A, and the lock-free MQ 616A of the Session 1 Thread Logic 602A. Also, Session N+M Thread Logic 602D includes RTP packets 604D, a reorder buffer 606D, a decoder 608D, service logic 610D, an encoder 612D, encoded RTP packets 614D, and a lock-free MQ 616D that are structurally and functionally similar to the RTP packets 604A, the reorder buffer 606A, the decoder 608A, the service logic 610A, the encoder 612A, the encoded RTP packets 614A, and the lock-free MQ 616A of the Session 1 Thread Logic 602A. Furthermore, additional Session K Thread Logic(s) and/or Session L Thread Logic(s) (not shown in FIG. 6) may exist, with similar structures and functionality, for integer values of K between 1 and N and integer values of L between N+1 and N+M.

As shown in FIG. 6, the lock-free MQ 616A for Session 1 Thread Logic 602A and the lock-free MQ 616B for Session N Thread Logic 602B (and, in some cases, one or more Session K Thread Logic(s), in which K is an integer greater than 1 and may be the same or different as N and/or M) provide data to a pacer thread 618A. The pacer thread 618A may correspond to the speed buffer 414. The pacer thread 618A fetches RTP packets from lock-free MQs 616A and 616B (and other lock-free MQs associated with the Session K Thread Logic(s)) every 20 ms (or other threshold time period) and sends out (e.g., to the device 416) the fetched RTP packets at an adaptive rate, which may be different from the threshold time period. As shown, the fetching occurs at time=20 ms, 40 ms, 60 ms, and so on.

Sometimes, there may be more than N threads (threads N+1 . . . . N+M may exist), and an additional pacer thread 618B (which functions as an additional speed buffer, similar to the speed buffer 414) may be added. As shown, the lock-free MQ 616C for Session N+1 Thread Logic 602C and the lock-free MQ 616D for Session N+M Thread Logic 602D (and, in some cases, one or more Session L Thread Logic(s), in which Lis an integer greater than 1 and may be the same or different as N and/or M) provide data to the pacer thread 618B. Similarly to the pacer thread 618A, the pacer thread 618B fetches RTP packets from lock-free MQs 616C and 616C (and other lock-free MQs associated with the Session L Thread Logic(s)) every 20 ms (or other threshold time period) and sends out (e.g., to the device 416) the fetched RTP packets at the adaptive rate, which may be different from the threshold time period. As shown, the fetching occurs at time=20 ms, 40 ms, 60 ms, and so on.

The thread diagram 600 of shows multiple thread logics 602A, 602B feeding into a single pacer thread 618A. If sufficient (e.g., more than N) thread logics exist, multiple pacer threads 618A, 618B, rather than a single pacer thread 618A may be used. Furthermore, the pacer thread 618A may process data from multiple lock-free MQs 616A, 616B, with each lock-free MQ being associated with a different thread logic 602A, 602B.

Figure 7:
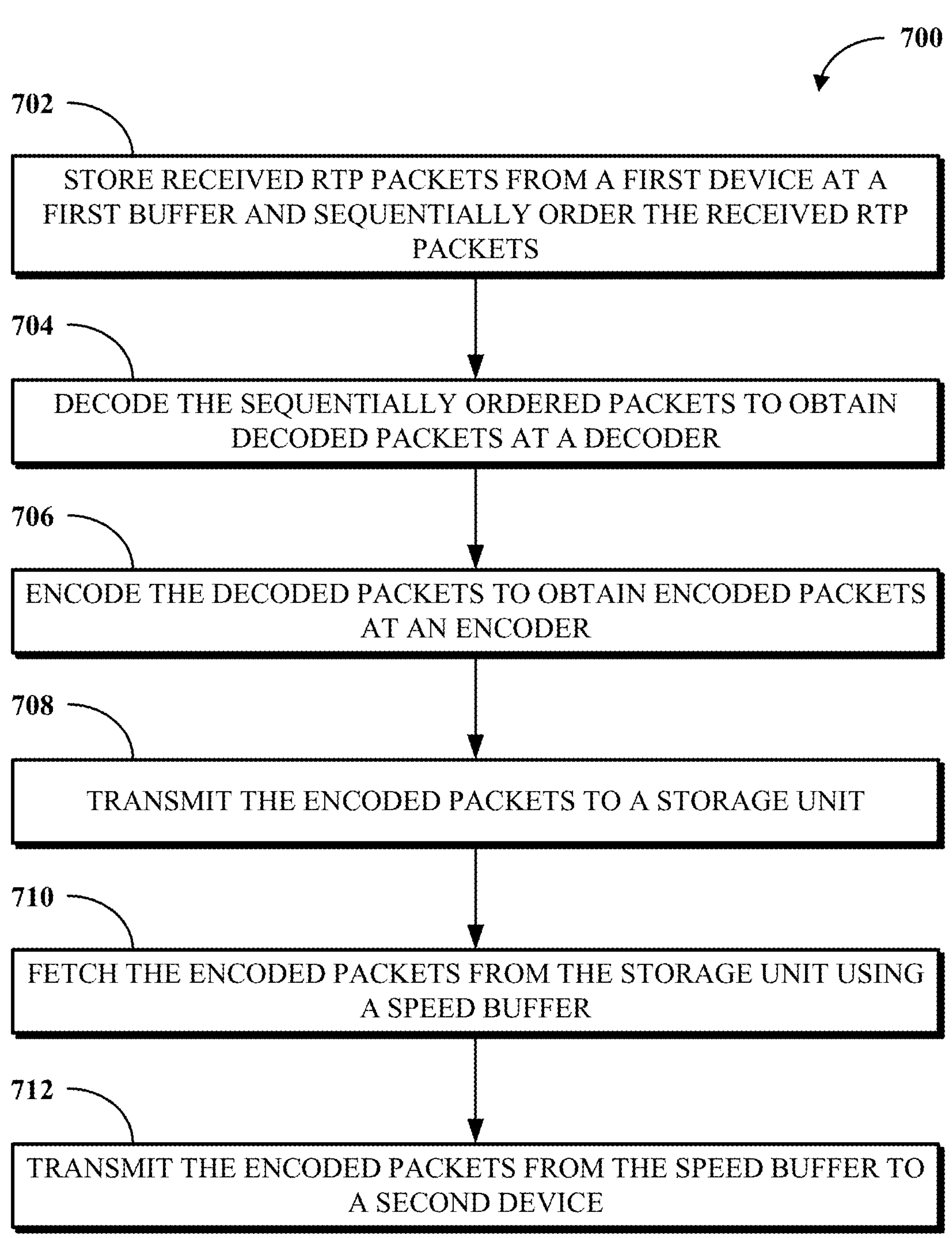
FIG. 7 is a flowchart of an example of a technique for packet processing.
Figure 8:
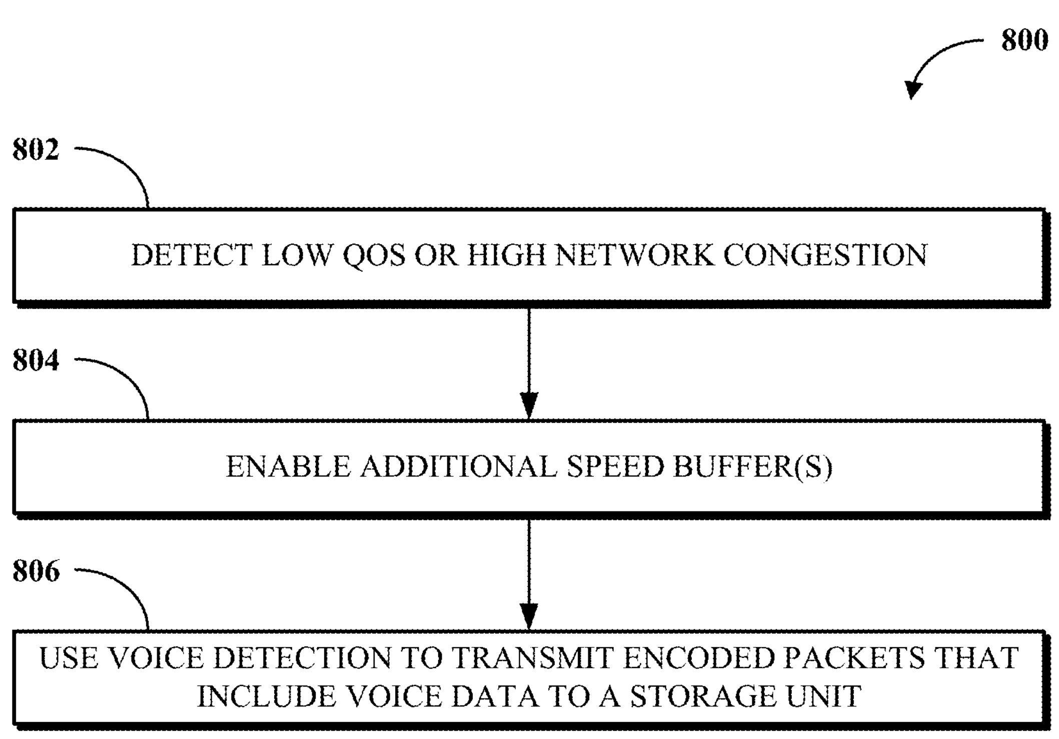
FIG. 8 is a flowchart of an example of a technique for handling low quality of service or high network congestion.

To further describe some implementations in greater detail, reference is next made to examples of techniques which may be performed by packet processing at a server. FIG. 7 is a flowchart of an example of a technique 700 for packet processing, and FIG. 8 is a flowchart of an example of a technique 800 for handling low quality of service or high network congestion. The techniques 700 or 800 can be executed using computing devices, such as the systems, hardware, and software described with respect to FIGS. 1-6. The techniques 700 or 800 can be performed, for example, by executing a machine-readable program or other computer-executable instructions, such as routines, instructions, programs, or other code. The steps, or operations, of the techniques 700 or 800 or another technique, method, process, or algorithm described in connection with the implementations disclosed herein can be implemented directly in hardware, firmware, software executed by hardware, circuitry, or a combination thereof.

For simplicity of explanation, the techniques 700 and 800 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 7 illustrates a technique 700 for packet processing. At block 702, a server (e.g., the server 402) stores received RTP packets (e.g., the RTP packets 418) from a first device (e.g., the device 404) at a first buffer (e.g., the reorder buffer 406) and sequentially orders the received RTP packets to obtain sequentially ordered packets. The RTP packets may be received using a receiver of the server. The receiver may be a component of the network interface (e.g., the network interface 214) of the server.

At block 704, the server decodes the sequentially ordered packets to obtain decoded packets at a decoder (e.g., the decoder 408). The decoder may decode the sequentially ordered packets to access the payload of the packets. The payload may include the data (e.g., audio data) being transmitted by the packets. For example, in a low QoS or high network congestion setting, voice or speech recognition technology (applied at the server) could be used to only encode packets that include human voice or speech. This reduces the number of packets transmitted from the server 402 to the device 416, thereby reducing network congestion or increasing QoS.

At block 706, the server encodes the decoded packets to obtain encoded packets at an encoder (e.g., the encoder 410). The decoded packets may be encoded for eventual transmission to a second device (e.g., the device 416). For example, the decoded packets may be encoded into packets for transmission according to RTP. In some implementations, additional processing may occur between decoding and encoding the packets at blocks 704 and 706, respectively.

At block 708, the server transmits the encoded packets from the encoder to a storage unit (e.g., the storage unit 412). In some implementations, the storage unit is a lock-free storage unit. The storage unit allows (e.g., to the speed buffer) data access when a data packet processing speed is below a threshold processing speed. The threshold processing speed may be adaptive. The threshold processing speed may be based on a size of the speed buffer, with a larger speed buffer resulting in faster processing. The encoder may encode the/decoded packets based on a codec of the second device involved in the active session (or other device(s) involved in the active session), which is to later receive the packets, for processing by the second device.

At block 710, the server fetches the encoded packets from the storage unit at a first interval using a second buffer (e.g., the speed buffer 414). The storage unit stores packets until the packets are ready for distribution to the second buffer, as determined by the second buffer. In some implementations, the server also includes an additional second buffer (e.g., an additional speed buffer or the additional pacer thread 618B). The server enables the additional second buffer based on network congestion and/or based on a detection of a QoS that is below a threshold. The additional second buffer may be responsible for processing packets from different storage units associated with different threads at the server, as illustrated in FIG. 6.

At block 712, the server causes a transmitter (e.g., the network interface 214 may include the transmitter and/or a receiver) to transmit the encoded packets from the second buffer to the second device at a second interval. The second buffer may adjust the second interval based on the network congestion or a capability of the second device. The capability of the second device may include, for example, a buffer size or jitter handling capabilities at the second device. The server may determine the buffer size or jitter handling capabilities by querying the second device. If the server does not receive a response to the querying of the second device, the server may determine that the buffer size is low and the jitter handling capabilities of the second device are low. The second interval may be set to ensure that the second device is capable of handling all the incoming packets, based on the buffer size or the jitter handling capabilities of the second device. In some implementations, the first buffer, the encoder, the decoder, and the second buffer execute serially with one another, for example, within a single thread of the processing circuitry (e.g., the processor 202) of the server.

FIG. 8 illustrates a technique 800 for handling low quality of service or high network congestion. At block 802, a server (e.g., server 402) detects low QoS or high network congestion. The low QoS may be detected by measuring, using a network interface of the server, a network speed. For example, download network speeds below 3 Mbps or upload network speeds below 0.3 Mbps may correspond to low QoS. Alternatively, a jitter at a device (e.g., device 404 or device 416) exceeding 50 ms may correspond to low QoS. Network congestion may occur when more than a threshold number of packets per unit time traverse the server.

At block 804, the server enables one or more additional speed buffers in response to the detected low QoS or high network congestion. For example, the pacer thread 618C may be enabled as shown in FIG. 6. The additional speed buffers may allow data from one or more storage units to be processed in parallel in multiple threads of processing circuitry (e.g., processor 202) of the server. In some implementations, each speed buffer may receive data from one or multiple storage units. In some implementations, each storage unit provides data to one speed buffer. The one or more additional speed buffers may be enabled on an as-needed basis, for example, based on network congestion, QoS, or both. In an example, the server may automatically enable more speed buffers as network congestion increases, QoS decreases, or both.

At block 806, the server uses voice detection to transmit encoded packets that include voice data to a storage unit (e.g., storage unit 412 or one of the lock-free MQs 616A, 616B, 616C or 616D). The server forgoes transmitting encoded packets that lack voice data (e.g., as determined by artificial intelligence, such as a trained neural network or other artificial intelligence technology, running at the server) to the storage unit. Many different voice detection techniques may be used to identify the packets that lack the voice data. For example, an artificial neural network may be trained to identify packets that have or lack human speech therein.

Some communications carriers (e.g., some cellular carriers) in certain areas or locations (e.g., rural areas, indoor areas, subway tunnels or roadway tunnels) are notorious for having poor audio quality due to jitter. For communications carriers that are known to have poor audio quality, a speed buffer may be implemented at a telephony server to handle the jitter to improve the audio quality. The speed buffer ensures that the packets are processed in the order in which they arrived and with proper timing between packets. QoS can be detected at the telephony server to automatically enable the speed buffer when the QoS falls below a QoS threshold. In some implementations, a telephony server implements a first speed buffer, detects a QoS below a threshold QoS, and enables additional speed buffers in response to the QoS being below the threshold QoS.

Some implementations relate to audio processing during audio calls. However, the invention can be extended to audio processing during live conference presentations. For example, if a speaker in a live online conference has a poor connection, the jitter correction can be done at the server rather than at each device viewing the online conference, ensuring that each device viewing the presentation has a similar experience. In some implementations, a server stores received packets from a first device at a first buffer, sequentially orders the received packets to obtain sequentially ordered packets, decodes the sequentially ordered packets to obtain decoded packets at a decoder, encodes the decoded packets to obtain encoded packets at an encoder, transmits the encoded packets from the encoder to a storage unit, fetches the encoded packets from the storage unit at a first interval using a second buffer, and causes a transmitter to transmit the encoded packets from the second buffer to a second device at a second interval.

Some implementations are described in conjunction with detecting and reducing jitter during calls or conferences between devices mediated by a server. However, the disclosed technology could also be used with jitter correction during receipt of Internet packets (e.g., instead of voice packets, as described above) when viewing a text and image-based webpage (e.g., blog article). The jitter in the webpage could be due to transmission errors from the web server hosting the webpage to a proxy server delivering the webpage to the device. In some implementations, a proxy server stores received data packets from a web server at a first buffer, decodes the received packets to obtain decoded packets at a decoder, encodes the decoded packets to obtain encoded packets at an encoder, transmits the encoded packets from the encoder to a storage unit, fetches the encoded packets from the storage unit at a first interval using a second buffer, and causes a transmitter to transmit the encoded packets from the second buffer to a client device at a second interval.

Some implementations are described below as numbered examples (Example 1, 2, 3, etc.). These examples are provided as exampled only and do not limit the disclosed technology.

Example 1 is a server comprising: processing circuitry and a memory, the memory comprising: a first buffer configured to process received RTP packets from a first device to obtain sequentially ordered packets; a decoder configured to decode the sequentially ordered packets to obtain decoded packets; an encoder configured to: encode the decoded packets to obtain encoded packets, and transmit the encoded packets to a storage unit; and a second buffer configured to: fetch the encoded packets from the storage unit at a first interval, and cause a transmitter to transmit the encoded packets to a second device at a second interval.

In Example 2, the subject matter of Example 1 includes, wherein the storage unit is a lock-free storage unit configured to allow data access when a data packet processing speed is below a threshold processing speed.

In Example 3, the subject matter of Examples 1-2 includes, wherein the second buffer is configured to adjust the second predetermined interval based on at least one of network congestion or a capability of the second device.

In Example 4, the subject matter of Examples 1-3 includes, the memory further comprising: an additional second buffer, wherein the server is configured to enable the additional second buffer based on network congestion.

In Example 5, the subject matter of Examples 1-4 includes, the memory further comprising: an additional second buffer, wherein the server is configured to enable the additional second buffer based on a detection of a quality of service (QOS) that is below a threshold.

In Example 6, the subject matter of Examples 1-5 includes, wherein the encoder is configured to encode the decoded packets based on a codec of the second device.

In Example 7, the subject matter of Examples 1-6 includes, wherein the first buffer, the encoder, the decoder, and the second buffer execute serially within a single thread of the processing circuitry.

In Example 8, the subject matter of Examples 1-7 includes, wherein the first buffer, the encoder, the decoder, and the second buffer execute serially with one another.

In Example 9, the subject matter of Examples 1-8 includes, a receiver configured to receive the RTP packets from the first device; and the transmitter configured to transmit the encoded packets to the second device.

In Example 10, the subject matter of Examples 1-9 includes, wherein the first buffer is a reorder buffer, and wherein the second buffer is a speed buffer.

Example 11 is a method comprising: processing received RTP packets from a first device to obtain sequentially ordered packets at a first buffer; decoding the sequentially ordered packets to obtain decoded packets at a decoder; encoding the decoded packets to obtain encoded packets at an encoder; transmitting the encoded packets from the encoder to a storage unit; fetching the encoded packets from the storage unit at a first interval using a second buffer; and causing a transmitter to transmit the encoded packets from the second buffer to a second device at a second interval.

In Example 12, the subject matter of Example 11 includes, wherein the storage unit is a lock-free storage unit configured to allow data access when a data packet processing speed is below a threshold processing speed.

In Example 13, the subject matter of Examples 11-12 includes, adjusting, using the second buffer, the second predetermined interval based on at least one of network congestion or a capability of the second device.

In Example 14, the subject matter of Examples 11-13 includes, enabling an additional second buffer based on network congestion.

In Example 15, the subject matter of Examples 11-14 includes, enabling an additional second buffer based on a detection of a quality of service (QOS) that is below a threshold.

Example 16 is a non-transitory computer-readable medium (e.g., computer readable medium) storing instructions operable to cause processing circuitry to perform operations comprising: processing received RTP packets from a first device to obtain sequentially ordered packets at a first buffer; decoding the sequentially ordered packets to obtain decoded packets at a decoder; encoding the decoded packets to obtain encoded packets at an encoder; transmitting the encoded packets from the encoder to a storage unit; fetching the encoded packets from the storage unit at a first interval using a second buffer; and causing a transmitter to transmit the encoded packets from the second buffer to a second device at a second interval.

In Example 17, the subject matter of Example 16 includes, wherein the storage unit is a lock-free storage unit configured to allow data access when a data packet processing speed is below a threshold processing speed.

In Example 18, the subject matter of Examples 16-17 includes, the operations further comprising: adjusting, using the second buffer, the second predetermined interval based on at least one of network congestion or a capability of the second device.

In Example 19, the subject matter of Examples 16-18 includes, the operations further comprising: enabling an additional second buffer based on network congestion.

In Example 20, the subject matter of Examples 16-19 includes, the operations further comprising: enabling an additional second buffer based on a detection of a quality of service (QOS) that is below a threshold.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A server comprising:

processing circuitry and memory hardware, the memory hardware comprising:

a first buffer configured to store packets from a first device;

a decoder configured to decode the packets to obtain decoded packets;

an encoder configured to:

encode the decoded packets to obtain encoded packets, and transmit the encoded packets to a storage unit; and a second buffer configured to:

fetch the encoded packets from the storage unit at a first interval, and cause a transmitter to transmit the encoded packets to a second device at a second interval.

2. The server of claim 1, wherein the first buffer stores the packets in a sequential order.

3. The server of claim 1, wherein the packets comprise real-time transport protocol (RTP) packets.

4. The server of claim 1, wherein an artificial intelligence technique is applied to the encoded packets in the storage unit to identify and remove packets that lack human speech.

5. The server of claim 1, wherein the storage unit is a lock-free storage unit.

6. The server of claim 1, the memory hardware comprising:

a third buffer, wherein the server is configured to enable the third buffer based on network congestion.

7. The server of claim 1, the memory hardware comprising:

a third buffer, wherein the server is configured to enable the third buffer based on a detection of a quality of service (QoS) that is below a threshold QoS.

8. A method comprising:

decoding packets stored at a first buffer to obtain decoded packets at a decoder;

encoding the decoded packets to obtain encoded packets at an encoder;

fetching the encoded packets at a first interval using a second buffer; and causing a transmitter to transmit the encoded packets from the second buffer to a device at a second interval.

9. The method of claim 8, wherein the first buffer stores the packets in an order based on a sequence.

10. The method of claim 8, wherein the packets comprise at least one real-time transport protocol (RTP) packet.

11. The method of claim 8, wherein an artificial intelligence technique is applied to the encoded packets to identify and remove packets that lack human speech.

12. The method of claim 8, wherein the encoded packets are transmitted to a lock-free storage unit.

13. The method of claim 8, comprising:

enabling a third buffer based on network congestion.

14. The method of claim 8, comprising:

enabling a third buffer based on a detection of a quality of service (QoS) that is below a threshold QoS.

15. At least one non-transitory computer readable medium storing instructions operable to cause processing circuitry to perform operations comprising:

decoding packets stored at a first buffer to obtain decoded packets at a decoder;

encoding the decoded packets to obtain encoded packets at an encoder;

fetching the encoded packets at a first interval using a second buffer; and causing a transmitter to transmit the encoded packets from the second buffer to a device at a second interval.

16. The at least one computer readable medium of claim 15, wherein the first buffer stores the packets in accordance with a sequence.

17. The at least one computer readable medium of claim 15, wherein the packets comprise one or more real-time transport protocol (RTP) packets.

18. The at least one computer readable medium of claim 15, wherein an artificial intelligence technique is applied to the encoded packets to identify and remove packets that lack human speech.

19. The at least one computer readable medium of claim 15, wherein the encoded packets are transmitted to a lock-free storage unit.

20. The at least one computer readable medium of claim 15, the operations comprising:

enabling a third buffer based on at least one of: a detected network congestion or a detected quality of service (QoS) that is below a threshold QoS.

* * * * *